United States Patent
Friedrich et al.

(10) Patent No.: US 11,731,705 B2
(45) Date of Patent: Aug. 22, 2023

(54) ROOF MODULE FOR AUTONOMOUS VEHICLES

(71) Applicant: HBPO GmbH, Lippstadt (DE)

(72) Inventors: Jonathan Friedrich, Wickede (DE); Steffen Hoewelkroeger, Delbrueck (DE); Tobias Tegethoff, Paderborn (DE)

(73) Assignee: HBPO GmbH, Lippstadt (DE)

( * ) Notice: Subject to any disclaimer, the term of this patent is extended or adjusted under 35 U.S.C. 154(b) by 65 days.

(21) Appl. No.: 17/434,801

(22) PCT Filed: Jan. 30, 2020

(86) PCT No.: PCT/DE2020/100059
§ 371 (c)(1),
(2) Date: Aug. 30, 2021

(87) PCT Pub. No.: WO2020/177804
PCT Pub. Date: Sep. 10, 2020

(65) Prior Publication Data
US 2022/0161860 A1    May 26, 2022

(30) Foreign Application Priority Data
Mar. 4, 2019    (DE) .................... 10 2019 105 339.0

(51) Int. Cl.
*B62D 25/06* (2006.01)
*B60R 16/02* (2006.01)
*B62D 35/00* (2006.01)

(52) U.S. Cl.
CPC .............. *B62D 25/06* (2013.01); *B60R 16/02* (2013.01); *B62D 35/007* (2013.01)

(58) Field of Classification Search
CPC ................................ B62D 25/06; B62D 65/02
(Continued)

(56) References Cited

U.S. PATENT DOCUMENTS

| 2017/0305242 A1 | 10/2017 | Gallagher et al. |
| 2018/0265019 A1 | 9/2018 | Dry et al. |

(Continued)

FOREIGN PATENT DOCUMENTS

| CN | 108945109 A | 12/2018 |
| DE | 202017101968 U1 | 9/2017 |

(Continued)

OTHER PUBLICATIONS

International Search Report dated Jun. 9, 2020, in International Application No. PCT/DE2020/100059.

(Continued)

*Primary Examiner* — Dennis H Pedder
(74) *Attorney, Agent, or Firm* — Patent Central LLC; Stephan A. Pendorf (57) ABSTRACT

A roof module for an autonomous vehicle comprising: an electronic unit containing a number of electronic components and/or environment recognition sensors; a carrier unit for accommodating the electronic unit; and fastening means for fastening the electronic unit to the carrier unit; wherein the carrier unit is designed as a roof structure component which can be fastened directly to a lateral body framework component and/or to a front body framework component and/or to a rear body framework component of the vehicle via fastening means and which forms a load-hearing receptacle for a roof outer skin of the vehicle.

14 Claims, 6 Drawing Sheets

(58) Field of Classification Search
USPC .......................................... 296/210, 193.04
See application file for complete search history.

(56) References Cited

U.S. PATENT DOCUMENTS

| | | | |
|---|---|---|---|
| 2019/0003895 A1 | 1/2019 | Krishnan et al. | |
| 2019/0210546 A1* | 7/2019 | Slovesko | ............... B62D 25/06 |
| 2019/0317521 A1 | 10/2019 | Nishi et al. | |

FOREIGN PATENT DOCUMENTS

| | | | |
|---|---|---|---|
| DE | 102017115675 A1 | | 1/2018 |
| DE | 202018103047 | * | 7/2018 |
| DE | 102018106008 A1 | | 9/2018 |
| WO | 2018135201 A1 | | 7/2018 |

OTHER PUBLICATIONS

Notification of Transmittal of Translation of the International Preliminary Report on Patentability dated Sep. 16, 2021, in International Application No. PCT/DE2020/100059.

* cited by examiner

ROOF MODULE FOR AUTONOMOUS VEHICLES

The invention, relates to a roof module for autonomous vehicles comprising an electronic unit containing a number of electronic components and/or environment recognition sensors, a carrier unit for accommodating the electronic unit, and fastening means for fastening the electronic unit to the carrier unit.

An electronic unit containing a multiplicity of environment recognition sensors, which is fastened by means of a carrier to a roof outer skin of a vehicle by a folded seam connection, is known from DE 20 2017 101 968 U1. The carrier structure comprises a sheet metal which forms a load-bearing function for the electronic components (sensors) of the electronic unit. The entire roof of the vehicle is consequently formed from the roof outer skin consisting of a sheet metal material and the carrier structure arranged in a cutout of the roof outer skin and the electronic unit. The disadvantage of the known roof is that the roof outer skin has to be configured to be so stable that it can accommodate the forces of the electronic unit.

An electronic unit having a multiplicity of electronic components (sensors), which is fastened via a carrier unit to a body framework component running in the longitudinal direction of the vehicle, is provided in DE 10 2018 106 008 A1. To this end, the carrier unit has claw-shaped vehicle connecting elements which, in each case, engage with a first end in a groove of the body framework component. The vehicle connecting element runs transversely to the vehicle longitudinal plane and is connected with another free end to the electronic unit. The electronic unit is consequently fastened in the manner of a conventional roof rack to the roof of the vehicle, wherein the electronic unit is detachably fastened via a suction device to the roof outer skin in a central region. The roof outer skin must have sufficient stability in order to be able to support the carrier unit or the electronic unit.

An electronic unit, having a multiplicity of electronic components (sensors, etc.) fastened via a carrier unit accommodating the same in a cutout of a roof outer skin to the same is known from DE 10 2017 115 675 A1. The carrier unit is additionally fastened via a bracket to a lateral body framework component of the vehicle. The disadvantage of the known solution is that the assembly outlay is relatively large.

The object of the present invention is to integrate an electronic unit in a roof of a vehicle so that the assembly is simplified, the number of components for fastening is reduced, installation space is saved and a stable fastening is guaranteed.

In order to achieve the object, the invention in conjunction with the preamble of Claim 1 is characterized in that the carrier unit is designed as a roof structure component which can be fastened directly to a lateral body framework component and/or to a front body framework component and/or to a rear body framework component of the vehicle via fastening means and which forms a load-bearing receptacle for a roof outer skin of the vehicle.

In accordance with the invention, a roof module is provided, which has a roof structure component as a carrier unit and which can be fastened directly to a body framework component of the vehicle via fastening means. The roof structure component has such strength and stiffness that it forms a load-bearing receptacle for multiple constructional units. Thus, the roof structure component can serve to accommodate an electronic unit and to accommodate a roof outer skin of the vehicle. Consequently, multiple constructional units can be fastened to the roof structure component. The vehicle manufacturer can easily fasten the roof structure component, which is in each case equipped with the functional constructional units, to the body framework. The roof structure component is preferably designed such that it carries the entire roof outer skin of the vehicle. The vehicle manufacturer does not have to additionally assemble the roof outer skin or a roof outer skin segment. The roof structure component is advantageously configured as a function of the functional constructional units integrated in the thus formed roof module so that adapted sufficient strength or stiffening is guaranteed. The basic idea of the invention is to construct a roof module with a load-bearing structure for a roof of the vehicle. The roof structure component is designed as a function of the integrated functional constructional units of the roof module. The vehicle manufacturer merely has to assemble the roof module on the body framework by fastening the roof structure component in order to form the roof structure. This can advantageously simplify the vehicle manufacturer's assembly process, wherein the roof module, which is already prefabricated, has all the required functional constructional units of the roof.

In accordance with a preferred embodiment of the invention, the roof structure component is non-positively or adhesively fastened to lateral body framework components of the vehicle, which are at least arranged opposite. The roof structure component is preferably connected non-positively by being screwed to the lateral body framework components. As a result, the roof module can be advantageously easily fastened to the vehicle.

In accordance with a further development of the invention, the lateral body framework component is designed as a longitudinal strut running in the vehicle longitudinal direction, to which an A-pillar and/or B-pillar and/or C-pillar and/or D-pillar of the vehicle is immediately transversely joined. Consequently, the roof structure component is advantageously an integral part of the body of the vehicle, wherein it is exclusively arranged in the roof region of the vehicle.

In accordance with a further development of the invention, the roof structure component has a framework having longitudinal and transverse members and, if necessary, a number of roof arches connecting the longitudinal and/or transverse members. As a result, the roof module advantageously has the necessary stiffness and strength in order to not only carry the functional constructional units but also to guarantee the stability of the vehicle interior in scenarios involving the roof collapsing in or the vehicle rolling over.

In accordance with a further development of the invention, the electronic unit has, on the one hand, a housing and, on the other hand, a transparent or partly transparent cover. The housing has a load-bearing function for the electronic components or sensors. The cover makes it possible in particular for the sensors to fulfil their function. Thanks to the two-part design of the housing and cover, the cover can be replaced inexpensively, for example in the event of damage, vandalism or becoming tarnished as a result of ageing.

In accordance with a further development of the invention, the housing of the electronic unit can be detachably or integrally connected to the framework of the roof structure component. In the case of an integral arrangement, the housing is preferably formed from a plastic material, while the framework consists of a metal material. In this way, the extent of the components can be reduced. If the housing of the electronic unit is detachably connected to the framework, this can simplify the process of manufacturing the housing and the framework since they each consist of a single material. This also guarantees a purity of variety of the components.

In accordance with a further development of the invention, the roof module is covered on the upper side by a planar trim part which has a rear spoiler on a rear side. The planar trim part makes it possible to arrange the roof module so as to optimize the aerodynamics, wherein the rear spoiler additionally reduces the air resistance or the uplift force. The planar trim part combines this function in a single component.

In accordance with a further development of the invention, a headliner of the vehicle is fastened to the roof structure component. Consequently, the roof module also advantageously has functions affecting the vehicle interior or functions which can be operated from the same.

In accordance with a further development of the invention, the roof outer skin and the housing of the electronic unit have openings aligned with one another, which can be opened and closed by means of a closure element. For example, the closure element of the housing can be designed as a flap. The closure element of the roof outer skin can, for example, be designed as a segment which can be brought into the closing position via clips or hook and loop fasteners. The opening which can consequently be exposed in an opening position of the closure element can serve as a service shaft in order to be able to perform maintenance work on the electronic unit from the passenger compartment. For example, electronic components of the electronic unit can consequently be easily replaced.

In accordance with a further development of the invention, the closure element of the housing and/or of the roof outer skin is connected via a sealing means to an opening edge of the housing or of the roof outer skin. In this way, a sealed execution of the electronic unit is guaranteed so that the interior of the electronic unit is protected against dust, moisture and dirt.

In accordance with a further development of the invention, a cooling-air duct which has an air inlet and an air outlet adjoins a wall of the electronic unit. The cooling-air duct extends between two edge sides of the same electronic unit and/or between edge sides of multiple electronic units, which are turned away from one another. This guarantees that the heat originating in the electronic unit can be dissipated to the surroundings. As a function of the arrangement of the at least one electronic unit within the roof module, the cooling-air duct consequently simply runs along the at least one electronic unit or continuously from the one electronic unit to the other electronic unit, wherein the electronic units are arranged at a distance from one another. The cooling-air duct advantageously makes it possible to accommodate the surrounding air via the front air inlet, viewed in the direction of travel. Heat can be exchanged at, for example, a bottom wall of the electronic unit, wherein the heated air is then moved in, the opposite direction to the direction of travel to the air outlet of the cooling-air duct and is output to the surroundings at the air outlet.

In accordance with a further development of the invention, the air inlet and/or air outlet of the cooling-air line is/are arranged, directed in the longitudinal direction of the roof module and/or of the vehicle. In this way, it is guaranteed that a sufficient cooling air volume from the surroundings can be accommodated or output again.

In accordance with a further development of the invention, a cleaning unit is assigned to the transparent or partly transparent cover, by means of which cleaning unit the cover is cleaned at predefined or random time intervals. The cleaning unit can, for example, comprise wiper blades which wipe an outer side of the cover. The cleaning unit preferably additionally comprises water nozzles which spray the outer side of the cover during the cleaning operation. Alternatively, the cleaning unit can have air nozzles which are arranged directed towards the outer side of the cover. The air blast results in the outer side of the cover being cleaned. Advantageously, the cleaning unit safeguards the constant function of the electronic components, in particular the sensors.

Further advantages of the invention are set out in the further subclaims.

Exemplary embodiments of the invention are explained in greater detail below with reference to the drawings, wherein:

FIG. 4 shows a perspective representation of the front region of the roof module having cooling air ducts drawn in.

Figure 1:
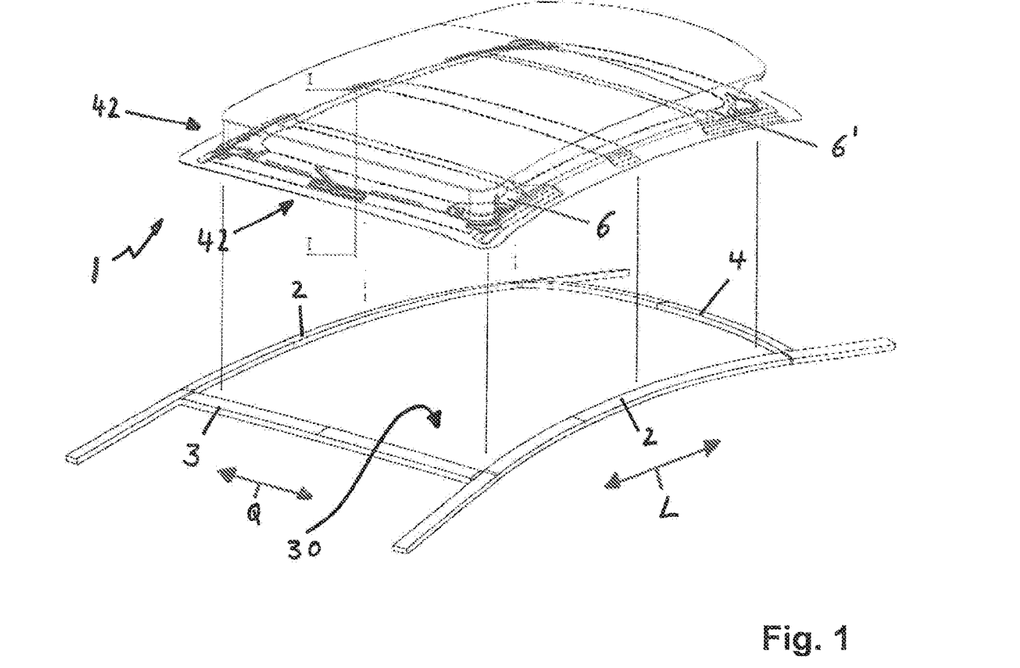
FIG. 1 shows a perspective representation of a roof module which can be fitted on and fastened to the roof side of a body framework.

A roof module 1 for autonomous or partly autonomous vehicles is mounted or can be fastened as a prefabricated constructional unit on or to a body framework of a vehicle. The body framework of the vehicle is arranged on the roof of the vehicle. In the present exemplary embodiment, it has lateral body framework components 2 running in, a longitudinal direction L of the vehicle, a front body framework component 3 and a rear body framework component 4. The front body framework component 3 and the rear body framework component 4 run in a transverse direction Q of the vehicle and, indeed, substantially transversely to the lateral body framework component 2. The front body framework component 3 and the rear body framework component 4 connect the lateral body framework components 2 to one another, which run at a distance from one another and parallel to one another. The front body framework component 3 is arranged at the front in the direction of travel of the vehicle and the rear body framework component 4 is arranged at the rear in the direction of travel of the vehicle. The lateral body framework components 2, the front body framework component 3 and the rear body framework component 4 form a roof body framework 5, to which the prefabricated roof module 1 is directly fastened, preferably non-positively by being screwed, via fastening means which are inherently known.

Figure 2:
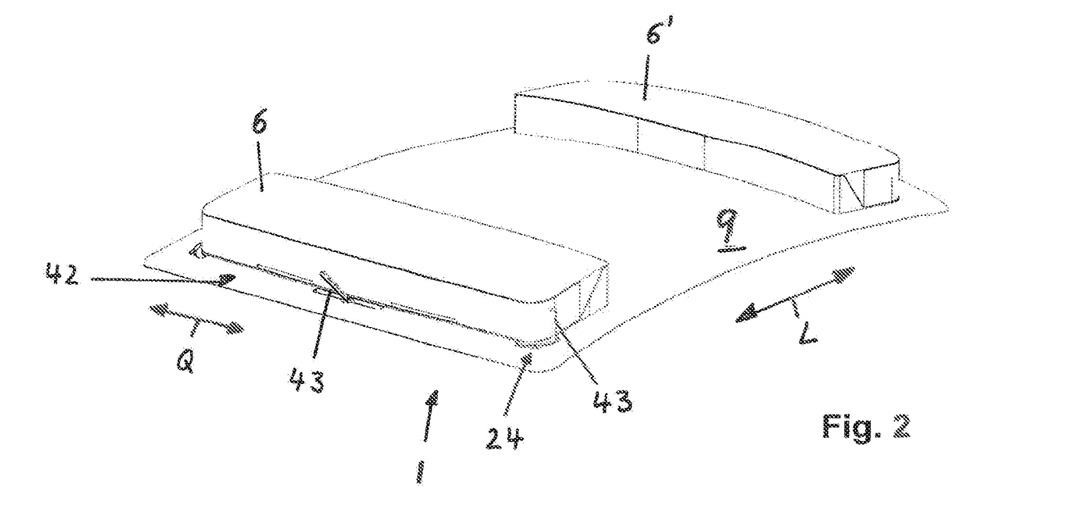
FIG. 2 shows a perspective representation of the roof module having an electronic unit on the front side and on the rear side containing electronic components.
Figure 3:
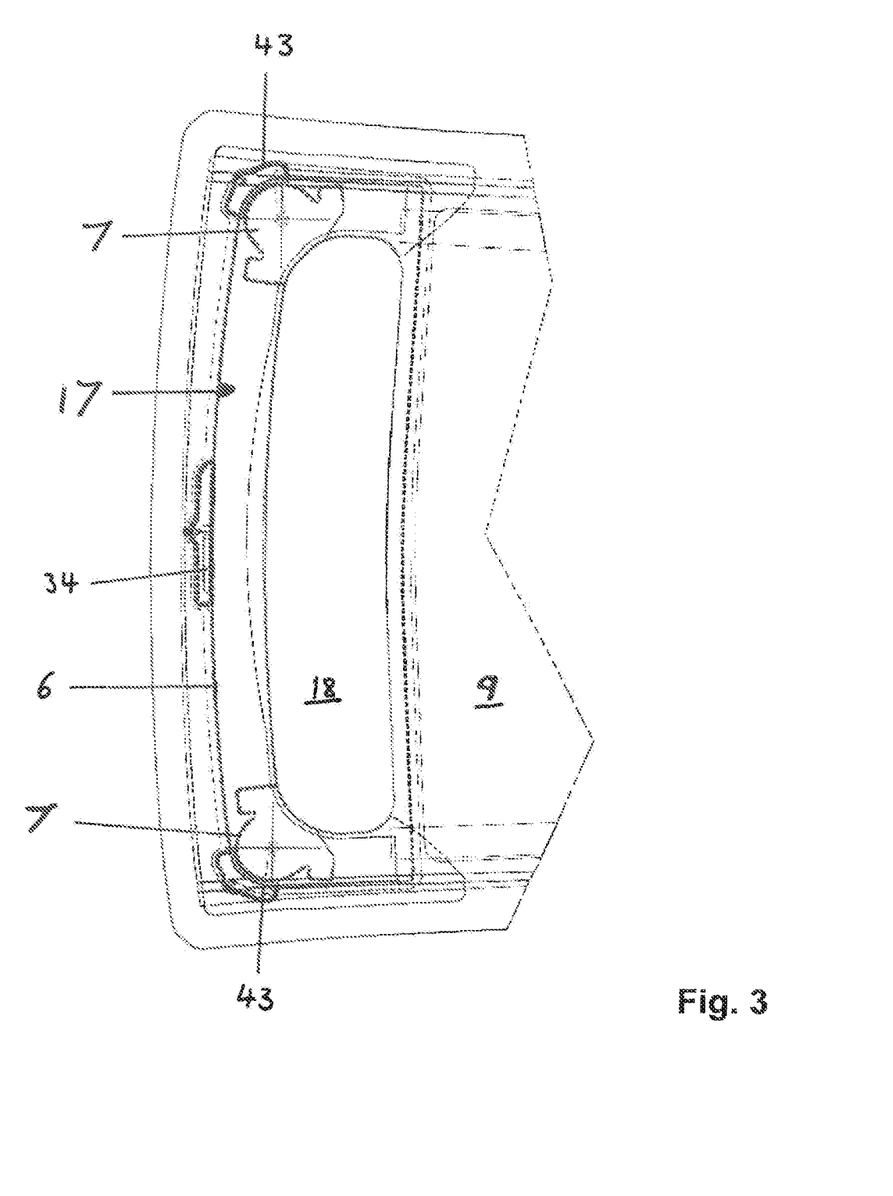
FIG. 3 shows a top view of the roof module in the front region of the same.

The roof module I has, in the present exemplary embodiment, two electronic units 6, 6' arranged at a distance from one another in the longitudinal direction L of the roof module 1, in which a multiplicity of environment recognition sensors 7 and further electronic components are arranged. The sensors 7 can, for example, be designed as LiDAR and RADAR sensors. Cameras, screens, lighting elements or the like can be integrated as electronic components in the electronic unit 6, 6'.

The roof module 1 further comprises a carrier unit 8 which is designed as a roof structure component so that constructional units relevant to the roof, such as for example the electronic unit 6, 6', can be accommodated in a load-bearing manner. The roof structure component 8 not only serves to accommodate the front electronic unit 6 and the rear electronic unit 6', but also to accommodate a roof outer skin 9 and a headliner 10. Consequently, the roof structure component 8 serves as a holder for all the constructional units arranged in the roof region of the vehicle, which are arranged both inside and outside of the vehicle. The roof module 1 can consequently be provided to the vehicle manufacturer as a prefabricated roof constructional unit, wherein the roof module 1 is exclusively fastened by fastening the roof structure component 8 to at least the lateral body framework components 2 and, if necessary, to the front body framework component 3 and the rear body framework component 4 on the vehicle.

Alternatively, the roof structure component 8 can also be adhesively fastened to the body framework components 2, 3, 4.

The lateral body framework components 2 can, for example, be designed as longitudinal struts, of which an A-pillar (not represented) and/or B-pillar and/or C-pillar and/or D-pillar of the vehicle are joined on the underside. The front body framework component 3 and the rear body framework component 4 are, for example, each designed as a transverse strut which runs transversely to the vehicle longitudinal direction L.

The roof structure component 8 is preferably designed as a framework having longitudinal members 11 running in the longitudinal direction L of the roof module 1 and transverse members 12 running transversely to the longitudinal members 11. The longitudinal members 11 are arranged at such a distance from one another that they can be fastened to the longitudinal struts 2 of the roof body framework 5, The transverse members 12 running in the transverse direction Q of the roof module 1 or of the vehicle are arranged at such a distance from one another that they can be fastened to the front transverse strut 3 or to the rear transverse strut 4. In a middle region of the longitudinal members 11, a roof arch 13 can extend from the one longitudinal member 11a to the opposite longitudinal member 11, which further increases the stability of the roof structure component 8. The roof arch 13 has a first end which is connected to the one longitudinal member 11, and a second end which is connected to the opposite longitudinal member 11 of the roof structure component 8.

If necessary, a further strengthening roof arch can also be provided, which connects the opposite transverse members 12.

Figure 8:
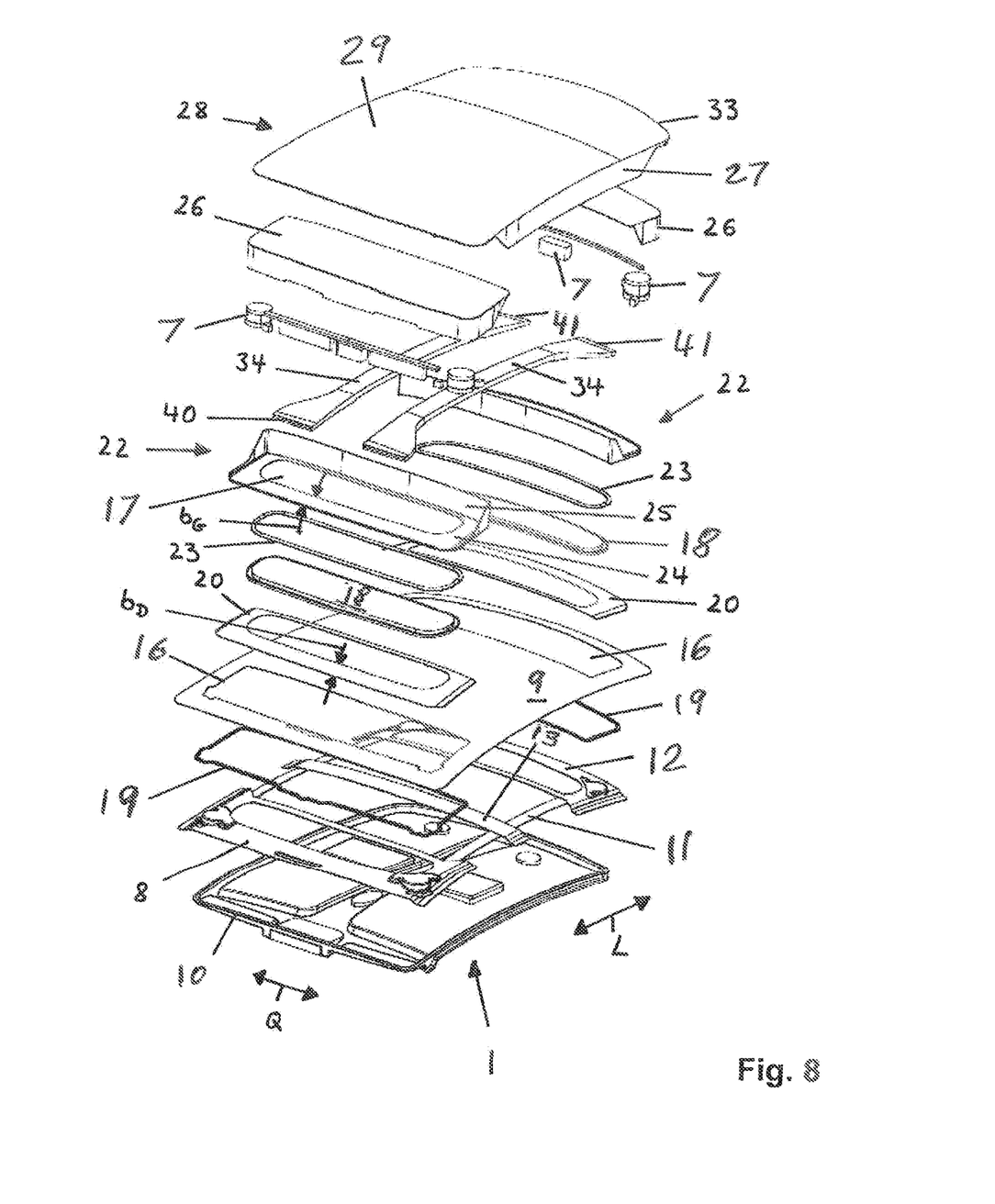
FIG. 8 shows an exploded representation of the roof module having a housing of the electronic unit which is fastened to a carrier unit of the roof module via a sealing element.

As can be seen from FIG. 8, the headliner 10 can be firmly connected on the underside of the roof structure component 8 to the same. The headliner 10 can have operating elements and light sources or further electronic components which can be actuated from the vehicle interior. Additional components such as grab handles and operating consoles can also be mounted on the headliner 10.

The roof outer skin 9 is planar and manufactured from a sheet metal material. It has an opening 16 in a front region of the same or of the roof module 1 and in a rear region 15 of the same or of the roof module 1, which opening corresponds to an access opening 17 of the front and rear electronic unit 6, 6'. The opening 16 of the roof outer skin 9 and/or the access opening 17 of the electronic units 6, 6' can be closed or opened by means of a closure element 18 so that access to the electronic components arranged in the front electronic unit 6 and/or the rear electronic unit 6' is guaranteed from a passenger interior. In this way, a component arranged in the front and/or rear electronic unit 6, 6' can be easily extracted and/or replaced. The closure element 18 can, for example, be designed as an insertion part or as a flap which can be detached and removed from the roof structure component 8 and/or the electronic unit 6, 6' via a clip connection (not depicted) or hook and loop fastener. The roof outer skin 9 is arranged in a sealing manner with respect to the roof structure component 8 via a sealing means 19 following the contour of the opening 16. The sealing means 19 is designed as an integral annular sealing element.

The roof outer skin 9 is mounted in a sealing manner with respect to the front or rear electronic unit 6, 6' via a sealing means 20. The sealing means 20 is designed to follow the contour of the opening 16 and is designed as a sealing element which has relatively wide ring struts 21. A width $b_D$ of the ring struts 21 coincides with a width $b_G$ of a load-bearing housing 22 of the electronic unit 6, 6'. The ring strut 21 consequently lies planarly between the housing 22 of the electronic unit 6, 6' on the one hand, and the roof outer skin 9 or the roof structure component 8 on the other hand.

The closure element 18 is arranged in a sealing manner with respect to an edge of the access opening 17 via a sealing means 23. The sealing means 23 is designed as a sealing element which consists of a rubberized, relatively thin material.

The housing 22 of the front electronic unit 6 or of the rear electronic unit 6' has a base side 24, to which the sensors 7 and further electronic components are preferably fastened. The base side 24 is preferably designed as a plate portion which extends in a plane. Joined to the base side 24 is an upright boundary side 25 which terminates the electronic unit 6, 6' in the direction of a transverse middle plane $M_Q$ of the roof module 1. The housing 22 is closed on the upper side by a transparent or partly transparent cover 26 so that the sensors 7 arranged inside the electronic unit 6, 6' or further electronic components fulfil their function. The sensors 7 are intended to detect the environment. Transmitting and/or receiving units, by means of which communication with other road users or vehicles is guaranteed, can be provided as further components.

An intermediate space between the front electronic unit 6 and the rear electronic unit 6' is occupied by a base part 27 of a trim 28. The trim 28 has a planar and continuous roof area element 29 which comprises an area which is equal to or larger than an opening 30 of the roof body framework 5. The roofing surface element 29 can, for example, be equal to or larger than the area of an outer edge 31 of the roof structure component 8.

Figure 9:
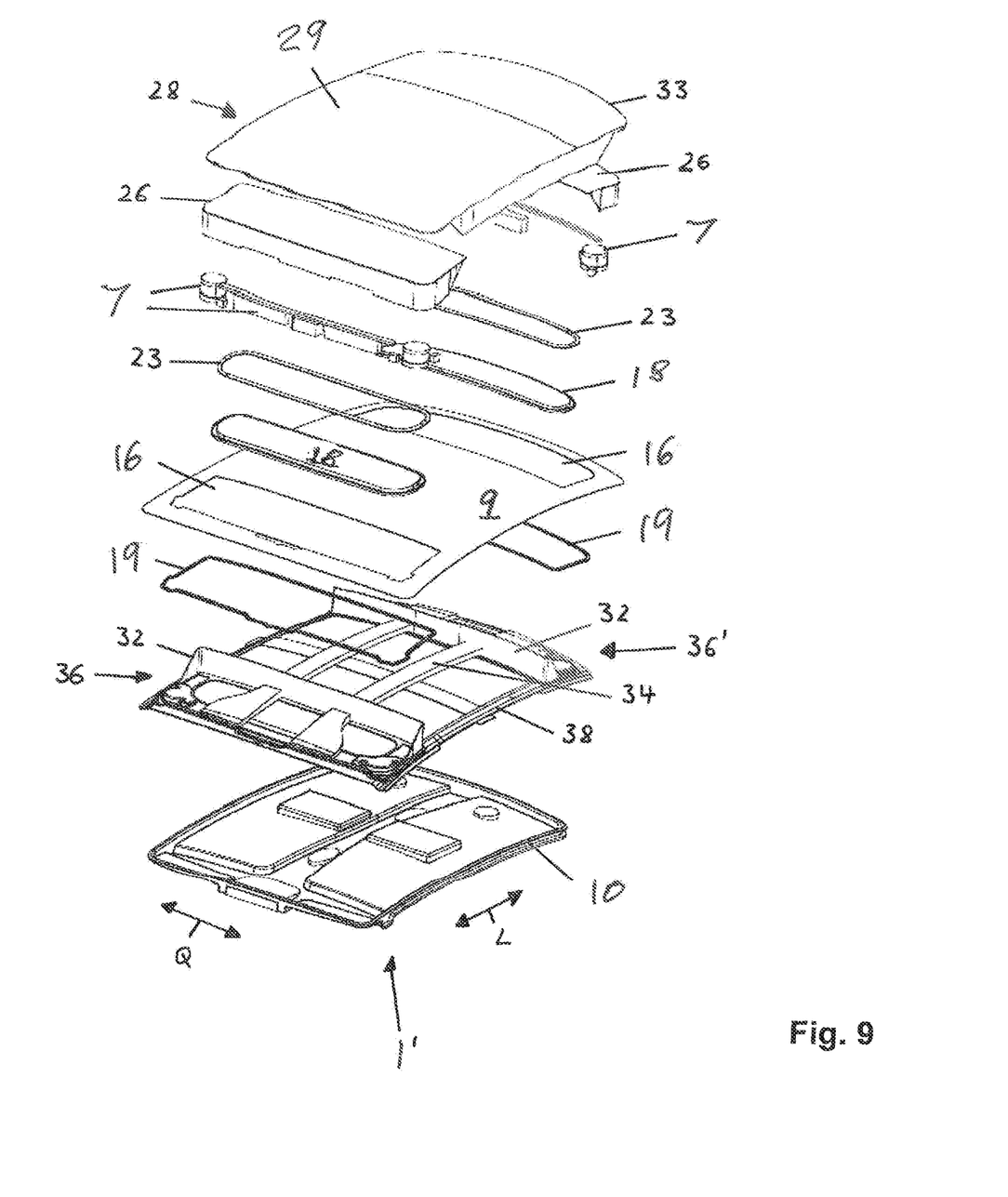
FIG. 9 shows an exploded representation of an alternative roof module, in which a housing of the electronic unit is integrally connected to the carrier unit.

In accordance with a first variant of the invention according to FIG. 8, the electronic unit 6, 6' is detachably connected to the roof structure component 8, for example non-positively via a screwed connection. In accordance with a second embodiment of the invention according to FIG. 9, an electronic unit 36, 36' is integrally connected to a roof structure component 38. For this purpose, a housing 32 of the electronic unit 36, 36' is integrally connected to the roof structure component 38. The roof structure component 38 and, the housing 32 form a hybrid component, wherein the roof structure component 38 consists of a metal material and the housing 32 consists of a plastic material. As a result, it is advantageously possible to dispense with the sealing element 20 according to the first embodiment of the roof module 1 in accordance with FIG. 8. The number of components can be reduced. Otherwise, the construction of the roof module 1' according to FIG. 9 corresponds to the construction of the roof module 1 according to FIG. 8. In particular, the roof structure component 8, 38 is manufactured from a steel or aluminum material.

The same components and component functions of the exemplary embodiments are provided with the same reference numerals.

The trim 28 has on a rear side a rear spoiler 33, by means of which the aerodynamics of the roof module 1, 1' can be improved.

Figure 4:
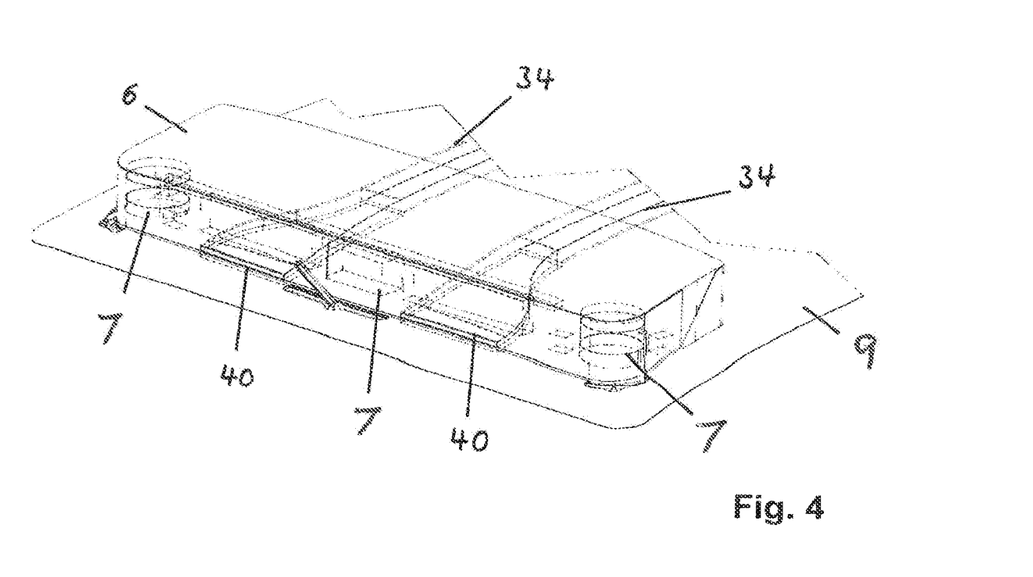
Figure 5:
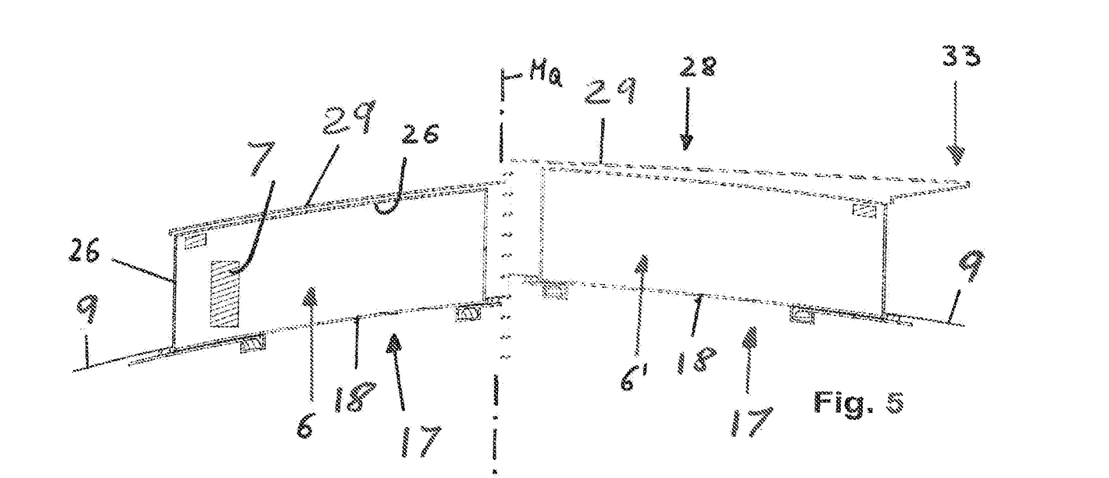
FIG. 5 shows a vertical longitudinal section through the roof module.
Figure 6:
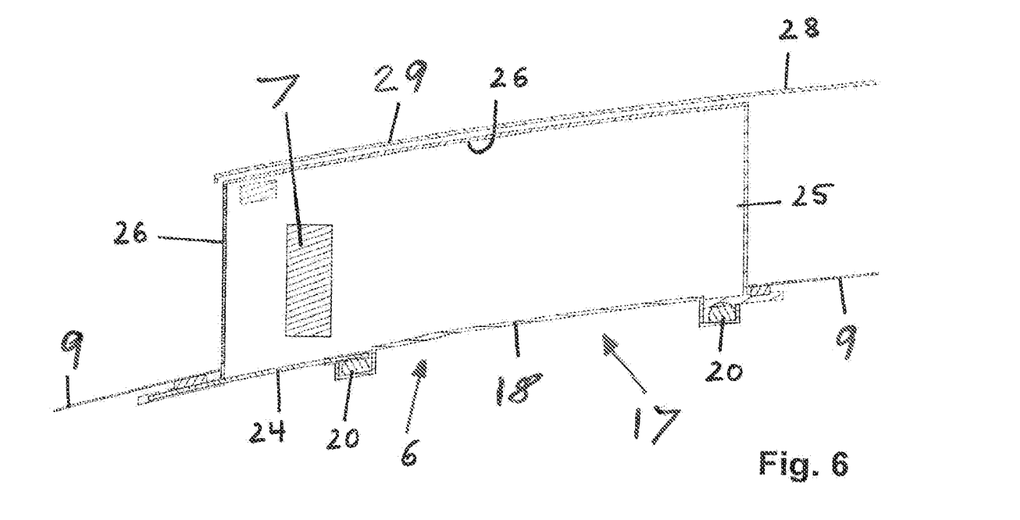
FIG. 6 shows a vertical longitudinal section through the front region of the roof module.
Figure 7:
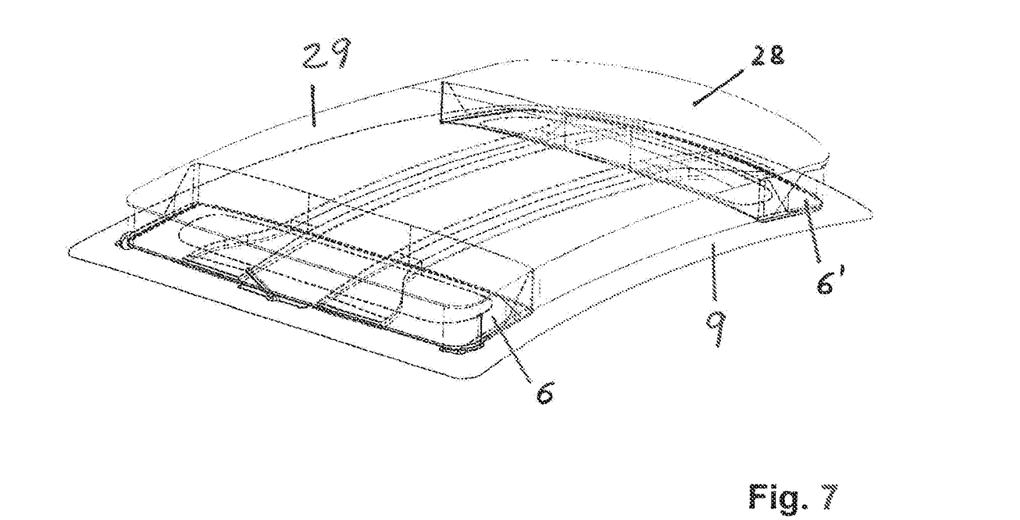
FIG. 7 shows a perspective representation of the roof module having drawn-in continuous cooling air ducts from a front edge up to a rear edge of the roof module.

The roof module 1, 1' has a number of cooling air ducts 34 which extend in each case from the front region 14 of the roof module 1, 1' to the rear region 15 of the same. In the present exemplary embodiment, two cooling air ducts 34 are provided, which are arranged offset from one another in the transverse direction Q. The cooling air ducts 34 each have an air inlet 40 at a front end and an air outlet 41 at a rear end. The air inlet 40 and the air outlet 41 are in each case arranged directed such that surrounding air can enter the cooling-air duct 34 and escape at the rear while the vehicle is traveling. A continuous air duct is present between the air inlet 40 and the air outlet 41, which makes possible a heat exchange or heat output of the sensors 7 or electronic components arranged in the front and rear electronic unit 6, 6'. The air inlet 40 and the air outlet 41 are designed as slots, wherein the air inlet 40 is arranged in the front region 14 of the roof module 1, and the air outlet 41 is arranged in the rear region 15 of the roof module 1, 1'.

A cleaning unit 42 is assigned to the electronic unit 6, 6' or the cover 26, by means of which cleaning unit an outer side of the partly transparent or transparent cover 26 can be cleansed. For example, the cleaning unit 42 can have wiper blades 43 which are arranged on an opposite side of the sensors 7 with respect to the cover 26. The wiper blades 43 are fastened to the roof structure component 8. If necessary, the roof structure component 8 can have water nozzles so that water as a cleaning liquid can be output in the direction of the cover 26, which can be distributed on the cover 26 by means of the wiper blades 43. Alternatively, the cleaning unit 42 can simply have air nozzles which are integrated in the roof structure component 8. The air nozzles are directed such that they output cleaning compressed air onto the transparent or partly transparent cover 26, by means of which the outer surface of the cover 26 at least in the region of the sensors 7 arranged therebehind or of further electronic components is cleaned.

The roof module 1, 1' or the roof structure component 8 can have means so that cables or a cabling harness can be routed into the roof module 1, 1'. Cables of the cabling harness are routed to the electronic components 7 or to the cleaning unit 2 or to the electronic components of the headliner 10.

It is understood that the aforementioned features of the exemplary embodiments can be used singularly or in multiples in combination. The exemplary embodiments described are not to be understood to be an exhaustive enumeration.

The invention claimed is:

1. A roof module for autonomous vehicles comprising:
an electronic unit (6, 6', 36, 36') containing a number of electronic components and/or environment recognition sensors (7);
a carrier unit (8, 38) for accommodating the electronic unit (6, 6', 36, 36'); and
fastening means for fastening the electronic unit (6, 6', 36, 36') to the carrier unit (8, 38);
wherein the carrier unit (8, 38) is a roof structure component which can be fastened directly to at least one of a lateral body framework component (2), a front body framework component (3), and a rear body framework component (4) of the vehicle via fastening means and which forms a load-bearing receptacle for a roof outer skin (9) of the vehicle, and
wherein the roof outer skin (9) is arranged on a framework of the carrier unit (8) via sealing means (19) or adhesively fastened to the framework of the carrier unit (8).

2. The roof module according to claim 1, wherein the carrier unit (8, 38) is non-positively or adhesively connected to at least one of the lateral body framework component (2), the front body framework component (3), and the rear body framework component (4) of the vehicle.

3. The roof module according to claim 1, wherein the lateral body framework component (2) is a longitudinal strut running in the vehicle longitudinal direction (L), to which at least one of an A-pillar, a B-pillar, and a C-pillar and/or D-pillar of the vehicle is immediately transversely joined, and the front body framework component (3) and the rear body framework component (4) are a transverse strut running transversely to the vehicle longitudinal direction (L).

4. The roof module according to claim 1, wherein the carrier unit (8, 38) has a framework having longitudinal and transverse members (11, 12).

5. A roof module for autonomous vehicles comprising:
an electronic unit (6, 6', 36, 36') containing a number of electronic components and/or environment recognition sensors (7);
a carrier unit (8, 38) for accommodating the electronic unit (6, 6', 36, 36'); and
fastening means for fastening the electronic unit (6, 6', 36, 36') to the carrier unit (8, 38);
wherein the carrier unit (8, 38) is a roof structure component which can be fastened directly to at least one of a lateral body framework component (2), a front body framework component (3), and a rear body framework component (4) of the vehicle via fastening means and which forms a load-bearing receptacle for a roof outer skin (9) of the vehicle,
wherein the electronic unit (6, 6', 36, 36') has a housing (22) and a transparent or partly transparent cover (26), wherein the number of sensors (7) and/or electronic components are fastened on a base side (24) of the housing (22), and
wherein a cleaning unit (42) is assigned to the transparent or partly transparent cover (26).

6. The roof module according to claim 1, wherein a housing (22) of the electronic unit (6, 6', 36, 36') is detachably or integrally connected to the carrier unit (8).

7. The roof module according to claim 1, wherein the framework of the carrier unit (8) consists of a metal material and the housing (22) of the electronic unit (6, 6') consists of a plastic material.

8. The roof module according to claim 1, wherein the roof module (1) is covered on the upper side by a planar trim (28) which has a rear spoiler (23) on a rear side.

9. The roof module according to claim 1, wherein a headliner (10) of the vehicle can be fastened to the carrier unit 8).

10. The roof module according to claim 1, wherein the roof outer skin (9) and a housing (22) of the electronic unit (6, 6', 36, 36') have openings (16, 17) aligned with one another, which can be opened or closed by means of a closure element (18).

11. The roof module according to claim 10, wherein, in the closing position, the closure element (18) is connected to the housing (22) of the electronic unit (6, 6') and the roof outer skin (9) via a sealing element (20).

12. A roof module for an autonomous vehicle having a front and a rear, the roof module comprising:
    an electronic unit (6, 6', 36, 36') containing a number of electronic components and/or environment recognition sensors (7);
    a carrier unit (8, 38) for accommodating the electronic unit (6, 6', 36, 36'); and
    fastening means for fastening the electronic unit (6, 6', 36, 36') to the carrier unit (8, 38);
    wherein the carrier unit (8, 38) is a roof structure component which can be fastened directly to at least one of a lateral body framework component (2), a front body framework component (3), and a rear body framework component (4) of the vehicle via fastening means and which forms a load-bearing receptacle for a roof outer skin (9) of the vehicle,
    wherein a cooling-air duct (34) adjoins a wall of the electronic unit (6, 6', 36, 36'), which cooling-air duct has an air inlet (40) and an air outlet (41) arranged offset from the same in the longitudinal direction of the roof module (1),
    wherein the cooling-air duct (34) runs through an electronic unit or through multiple electronic units arranged spaced apart from one another, and
    wherein the air inlet (40) faces the vehicle front, the air outlet (41) faces the vehicle rear, and air inlet (40) and air outlet (41) are arranged such that surrounding air can enter the cooling-air duct (34) air inlet (40) and escape from air outlet (41) at the rear while the vehicle is traveling when the roof module forms part of the autonomous vehicle.

13. The roof module according to claim 12, wherein the air inlet (40) and the air outlet (41) are arranged directed in the longitudinal direction (L) of the roof module (1) and/or of the vehicle.

14. The roof module according to claim 4, wherein a number of roof arches (13) connect the longitudinal and/or transverse members (11, 12).

\* \* \* \* \*